United States Patent
Chan et al.

(10) Patent No.: US 7,987,467 B2
(45) Date of Patent: Jul. 26, 2011

(54) SCALE ACROSS IN A GRID COMPUTING ENVIRONMENT

(75) Inventors: Waiman Chan, Poughkeepsie, NY (US); Rama K. Govindaraju, Hopewell Junction, NY (US); Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 1138 days.

(21) Appl. No.: 11/734,955

(22) Filed: Apr. 13, 2007

(65) Prior Publication Data

US 2008/0256223 A1   Oct. 16, 2008

(51) Int. Cl.
G06F 9/46 (2006.01)
G06F 15/173 (2006.01)

(52) U.S. Cl. ........................ 718/105; 709/226; 718/102

(58) Field of Classification Search .................. 709/226; 718/102, 105
See application file for complete search history.

(56) References Cited

U.S. PATENT DOCUMENTS

| | | | |
|---|---|---|---|
| 6,463,457 B1 * | 10/2002 | Armentrout et al. | 709/201 |
| 6,886,035 B2 | 4/2005 | Wolff | |
| 6,968,379 B2 | 11/2005 | Nielsen | |
| 7,024,671 B2 * | 4/2006 | Yamashita | 718/102 |
| 7,523,344 B2 * | 4/2009 | Qiao et al. | 714/6 |
| 7,596,788 B1 * | 9/2009 | Shpigelman | 718/100 |
| 7,673,305 B2 * | 3/2010 | Backer | 718/103 |
| 2005/0034130 A1 * | 2/2005 | Skovira | 718/105 |
| 2005/0154789 A1 * | 7/2005 | Fellenstein et al. | 709/223 |
| 2005/0172291 A1 | 8/2005 | Das et al. | |
| 2006/0059492 A1 | 3/2006 | Fellenstein et al. | |
| 2006/0190942 A1 * | 8/2006 | Inoue et al. | 718/100 |
| 2007/0294697 A1 * | 12/2007 | Theimer et al. | 718/102 |
| 2008/0229318 A1 * | 9/2008 | Franke | 718/104 |

* cited by examiner

Primary Examiner — Li B Zhen
Assistant Examiner — Charles E Anya
(74) Attorney, Agent, or Firm — Stephen Bongini; Fleit Gibbons Gutman Bongini & Bianco PL

(57) ABSTRACT

A method, grid computing environment, and computer readable medium for managing available resources in a grid computing environment are disclosed. The method includes determining, when a new job is submitted, if a first of the computing clusters has sufficient available resources to run the new job. If the first computing cluster does not have sufficient available resources to run the new job, the method further includes determining if a second of the computing clusters has sufficient available resources to run a first job that is currently running on the first computing cluster. If the second computing cluster has sufficient available resources to run the first job, the first job is migrated to the second computing cluster.

17 Claims, 8 Drawing Sheets

SCALE ACROSS IN A GRID COMPUTING ENVIRONMENT

STATEMENT REGARDING FEDERALLY SPONSORED RESEARCH OR DEVELOPMENT

This invention was made with Government support under Contract No. NBCH30390004 awarded by the Defense Advanced Research Projects Agency. The Government has certain rights in this invention.

FIELD OF THE INVENTION

The present invention generally relates to the field of grid computing environments, and more particularly relates to job migration within a grid computing environment.

BACKGROUND OF THE INVENTION

As grid computing techniques spread in the industry, parallel job schedulers are being extended to schedule jobs across multiple, physically distant machines. However, scheduling jobs in this manner causes various problems. One problem occurs because of the multi-dimensional nature of grid systems. In the past, computer systems have scaled up (by adding larger numbers of nodes) and scaled out (by increasing the number of CPUs at each node), and this has been handled by changes to the job scheduling systems. Now, grid based systems are introducing the new scaling dimension of scaling across multiple machines in the grid. One known method for job scheduling across grid-interconnected machines involves restricting jobs to one of the machines in the grid (for example, using an earliest-start criteria). However, this introduces a problem because node resources can become fragmented under certain job queue situations, so as to reduce the efficiency of the grid computing environment.

SUMMARY OF THE INVENTION

Briefly, in accordance with the present invention, disclosed is a method for managing available resources in a grid computing environment. The grid computing environment includes a plurality of computing clusters. The method includes determining, when a new job is submitted, if a first of the computing clusters has sufficient available resources to run the new job. If the first computing cluster does not have sufficient available resources to run the new job, the method further includes determining if a second of the computing clusters has sufficient available resources to run a first job that is currently running on the first computing cluster. If the second computing cluster has sufficient available resources to run the first job, the first job is migrated to the second computing cluster.

In another embodiment, a grid computing environment including a plurality of computing clusters is disclosed. The grid computing environment includes a scale across module for, when a new job is submitted, determining if a first of the computing clusters has sufficient available resources to run the new job. If the scale across module determines that the first computing cluster does not have sufficient available resources to run the new job, the scale across module determines if a second of the computing clusters has sufficient available resources to run a first job that is currently running on the first computing cluster. If this determination is positive, then the first job is migrated to the second computing cluster.

In yet another embodiment, a computer readable medium encoded with a program for managing available resources in a grid computing environment is disclosed. The grid computing environment includes a plurality of computing clusters. The computer program includes instructions for performing the steps of determining, when a new job is submitted, if a first of the computing clusters has sufficient available resources to run the new job. If the first computing cluster does not have sufficient available resources to run the new job, determining if a second of the computing clusters has sufficient available resources to run a first job that is currently running on the first computing cluster. If the second computing cluster has sufficient available resources to run the first job, migrating the first job to the second computing cluster.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Embodiments of the present invention perform job migration between clusters in a grid computing environment in order to allow for the efficient use of available grid computing resources. For example, in one embodiment when a new job is queued to run on a particular cluster with insufficient resources due to currently running jobs, one or more of these currently running jobs is migrated to a new cluster. The migrated jobs continue on the new cluster while leaving sufficient resources on the original cluster for the queued job.

Grid Computing Environment

Figure 1:
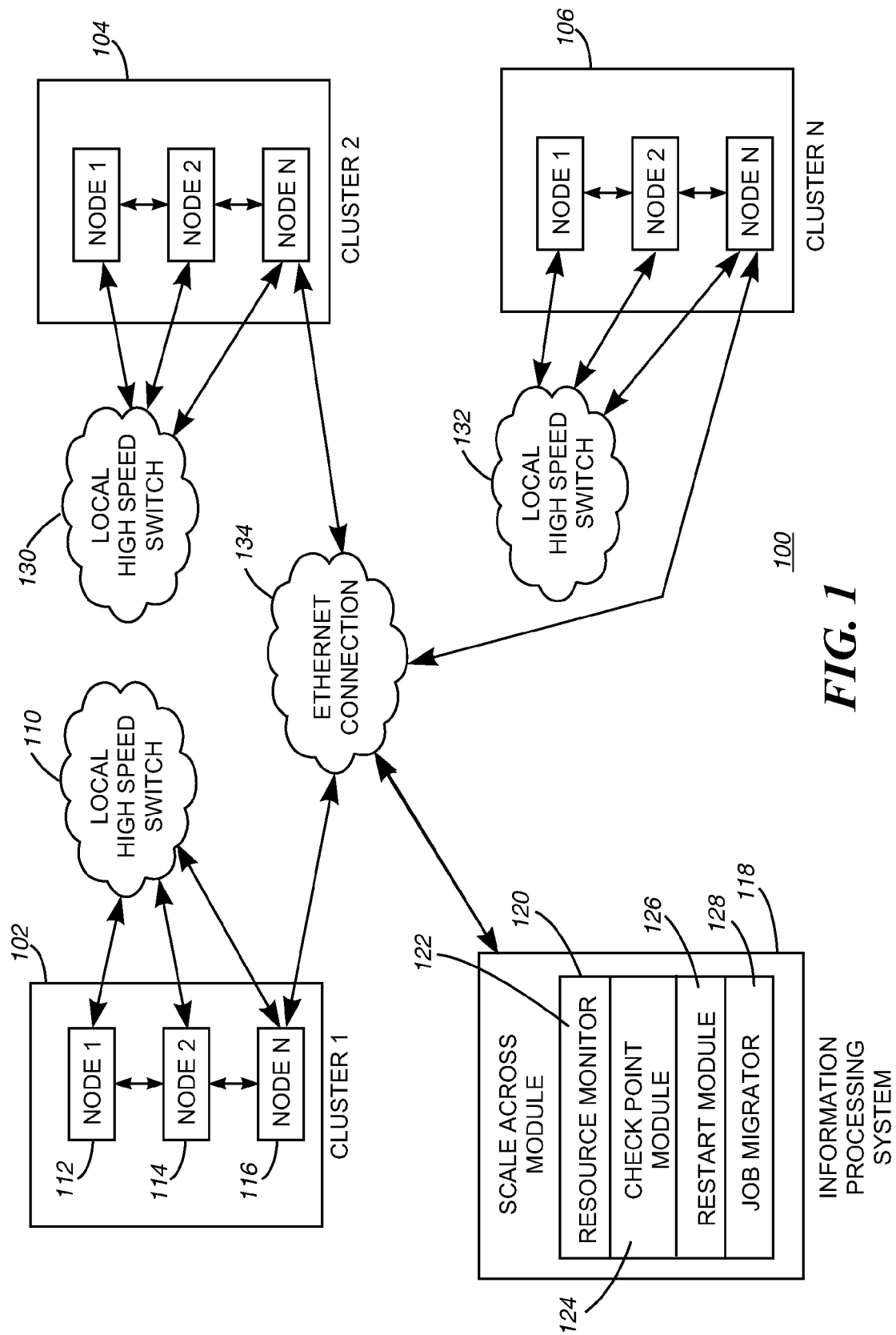
FIG. 1 is a block diagram illustrating a grid computing environment according to one embodiment of the present invention.

FIG. 1 shows a high level overview of a grid computing environment according to one embodiment of the present invention. Grid computing allows for a network of interconnected computing clusters to distribute job execution across a parallel infrastructure.

The grid computing environment 100 includes a plurality of computing clusters 102, 104, and 106. The computing clusters 102 can reside in the same location or at geographically diverse locations. In this exemplary embodiment, each computing cluster 102 comprises a plurality of computing nodes 112, 114, and 116, which are referred to as "resources" of the computing cluster. Each node 112, 114, 116 is communicatively coupled to a local high speed switch 110, 130, 132. The computing clusters 102, in this embodiment, are communicatively coupled to each other through an Ethernet connection 134 such as a Gbit Ethernet Link. A job scheduler residing either at a remote information processing system or at one or more of the computing clusters 102 schedules jobs for execution on one or more of the nodes of a computing cluster. The job scheduler takes into account the available resources of a computing cluster, the priority associated with the job, and scheduling policies when scheduling a job.

The grid computing environment 100, in this embodiment, also includes a remote information processing system 118 that is communicatively coupled to the computing clusters 102 via the Ethernet connection 134. Alternatively, the information processing system 118 can be coupled to only a single computing cluster 102 or coupled through another networking module besides the Ethernet connection 134. The information processing system 118, in this embodiment, includes a scale across module 120. The scale across module 120 allows for jobs to be migrated across various computing clusters 102 in order to provide efficient use of resources in the grid computing environment 100. The scale across module 120 of this embodiment includes a resource monitor 122, a checkpoint module 124, a job restart module 126, and a job migrator 128. The scale across module 120 and its components 122, 124, 126, and 128 are discussed in greater detail below. Alternatively, the scale across module 120 can reside within one of the computing clusters. Further, the present invention is not limited to a grid computing environment with a specific number of computing clusters or computing nodes, but is applicable to any grid computing environment.

Scale Across for Providing Efficient Use of Grid Computing Resources

Figure 2:
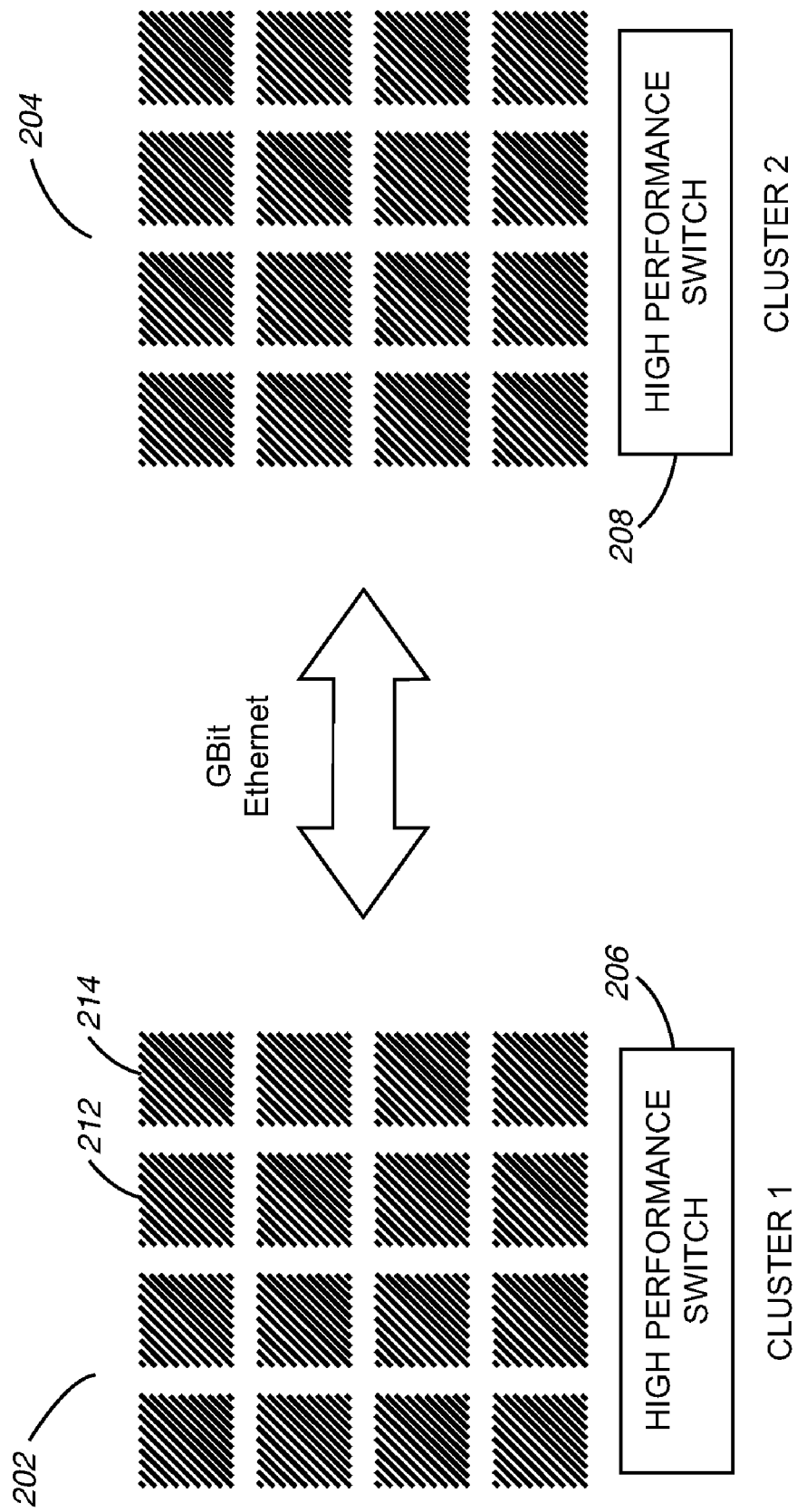
FIG. 2 is a block diagram illustrating interconnected computing clusters of a system according to an embodiment of the present invention.

FIG. 2 is a block diagram showing interconnected computing clusters 202 and 204 of a system according to an embodiment of the present invention. One example of a computing cluster 202 is an International Business Machines ("IBM") p-series machine. In this embodiment, each of the computing clusters 202 and 204 includes a high speed ("HPS") interconnect 206 and 208. One HPS interconnects nodes within computing cluster 202 and another HPS connects nodes within computing cluster 204. Nodes of the computing clusters 202, 204 are interconnected to one another using a GBit Ethernet connection as one example. It should be noted that the HPS and GBit Ethernet are different networks.

The communication between individual nodes 212 and 214 of one computing cluster is parallel and scalable, but the communication between the two clusters 202 and 204 is relatively fixed even as the system grows in size. This is a general characteristic of grid-connected systems. Because of this characteristic, parallel jobs which include inter-task communication are usually restricted to either the first cluster 202 or the second cluster 204, and are not allowed to span nodes of both computing clusters 202 and 204. Jobs are prevented from spanning nodes across two separate clusters because the inter-node communication bandwidth on a single cluster almost always out-performs the cluster-to-cluster communication bandwidth.

Figure 3:
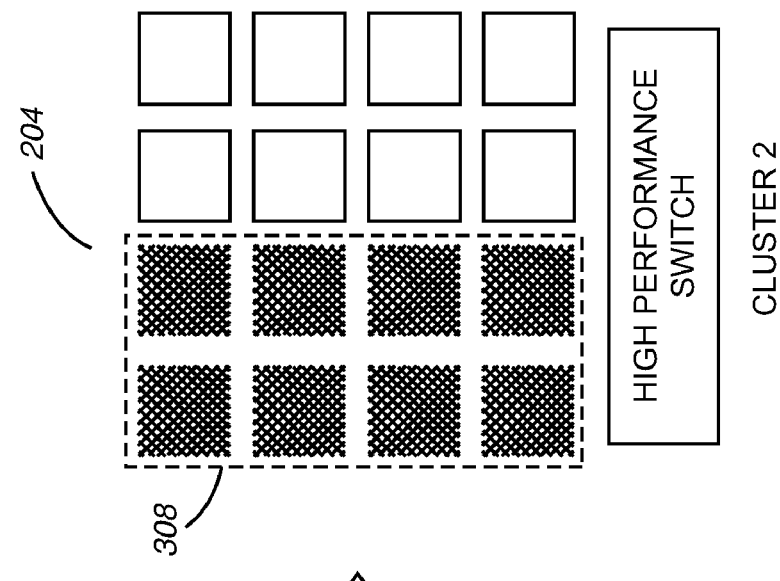
FIG. 3 is a block diagram illustrating resource availability for the computing clusters of FIG. 2.
Figure 3:
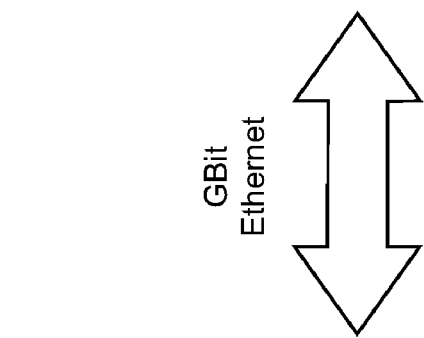
Figure 3:
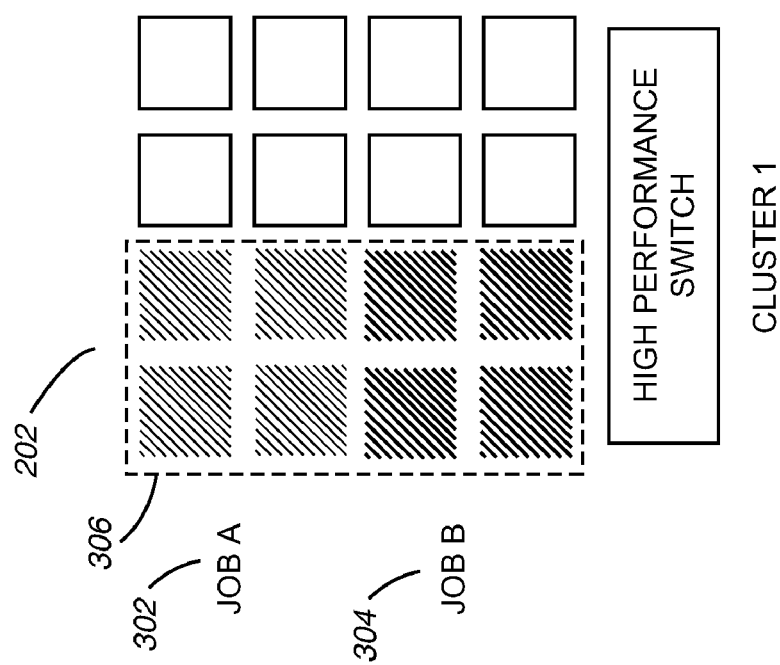

FIG. 3 is a block diagram illustrating various exemplary jobs running on the first computing cluster of FIG. 2. FIG. 3 shows each computing cluster 202 and 204 as having eight computing nodes currently busy (as illustrated by the dashed boxes 306 and 308) and eight free nodes (the nodes outside of the dashed boxes 306 and 308). The first computing cluster 302 has Job A 302 and Job B 304 currently using its resources. For example, Job A 302 is running on 4 nodes in cluster 1 202, Job B 304 is running on 4 nodes in cluster 1, and another job is running on 8 nodes in cluster 2.

If a Job C requiring twelve nodes is submitted to the grid system, the resource monitor 122 of the scale across module 120 determines that neither the first computing cluster 202 nor the second computing cluster 204 has sufficient resources for the new Job C. However, the resource monitor 122 determines that there are 16 free nodes across the grid system 100 (i.e., eight free nodes on the first computing cluster 202 and eight free nodes on the second computing cluster 204 in the current example). If the two computing clusters 202 and 204 could be used as a single resource the new Job C could be executed. However, because of the limitations of the computing cluster interconnection, new Job C cannot span the two clusters 202 and 204.

Therefore, the scale across module 120 performs job migration to more efficiently utilize the available resources of the grid computing system 100. In general, when sufficient resources are not available on any cluster to run a new job, the resource monitor 120 determines whether or not one or more of the currently running jobs can be run on another cluster to better utilize the available resources. In this example, the resource monitor 120 determines that one of the currently running jobs such as Job B 304 can be run on the second cluster 204 using its available resources. Therefore, job migration begins by having the checkpoint module 124 set a checkpoint for Job B 304.

The checkpoint module 124 saves all state information for Job B to files saved on a disk within a file system shared between the nodes on the cluster. This state information includes system state, state of memory associated with the job, state of all the processes associated with the job, and state of all the messages (pending and in-flight) related to the job. In other words, the checkpoint files include a state-snapshot of the job. The files include a complete state of the job because they are intended to be used to restart the job on similar resources at the exact time point at which the job is currently running. Once the checkpoint files are saved, they can be moved to any cluster on the grid (using appropriate secure file transfer techniques). Note that the compute nodes used to restart the job are identical in resources, but they do not need to be the identical compute nodes on which the job was originally running. Since the checkpoint files for the job (representing the job state at a specific moment in time) can be moved between the compute clusters on the grid, the job may optionally be restarted on compute nodes in any cluster that can receive the files.

The scale across module 120 cancels the currently running Job B 304, and the job migrator 128 moves Job B 304 to the second computing cluster 204. The job restart module 126 then restarts Job B 304 on the second computing cluster 204. The first computing cluster 202 then has twelve free nodes, as compared to eight free nodes prior to the migration of Job B. Therefore, the scale across module 120 can now start the new Job C on the first computing cluster 202.

In this embodiment, scheduling policies are predefined so as to dictate how jobs are migrated. For example, jobs with certain characteristics may have a higher priority than others, with lower priority jobs getting migrated to a new computing cluster before jobs with a higher priority. However, in further embodiments any other criteria can be used in deciding which job or jobs to migrate.

Figure 4:
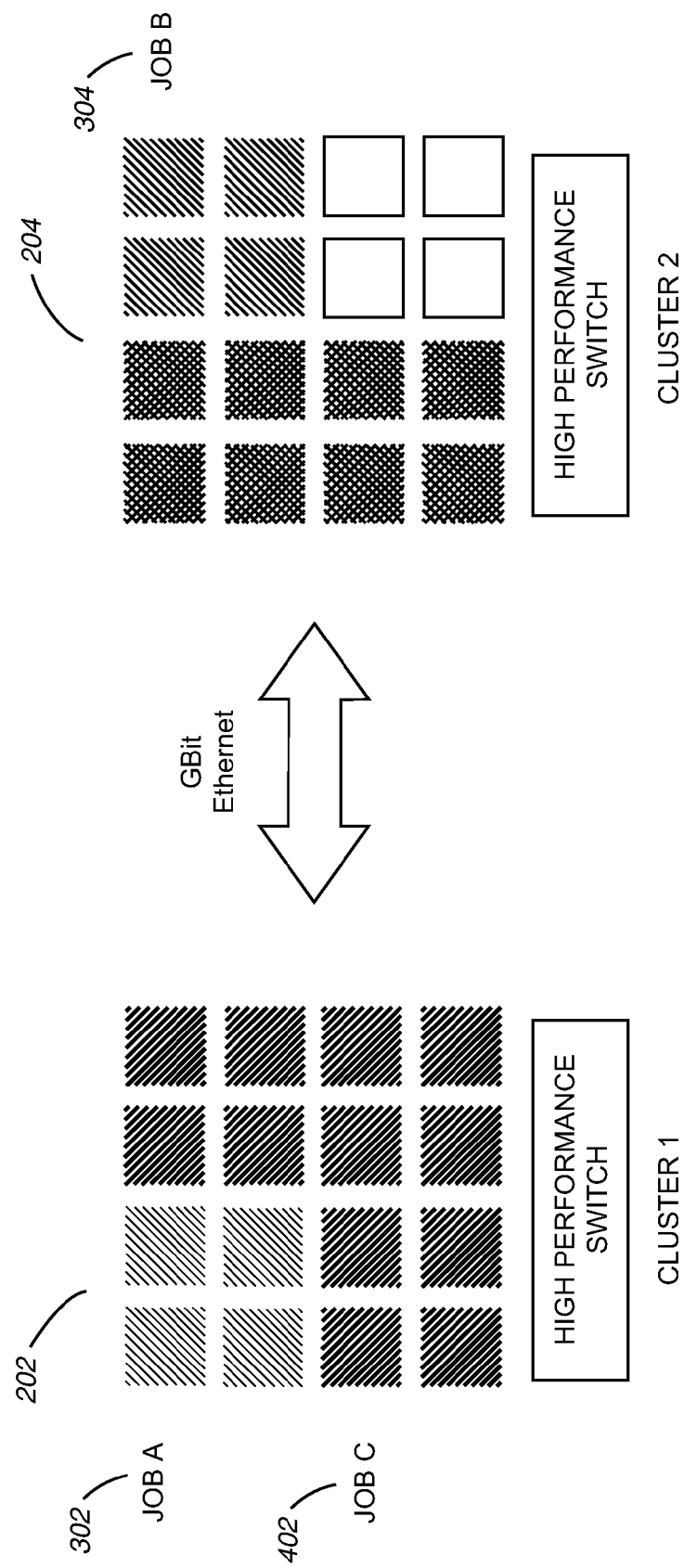
FIG. 4 is a block diagram illustrating resource availability for the computing clusters of FIG. 2 after job migration has been performed.

FIG. 4 shows the computing clusters of FIG. 3 after job migration has been performed by the scale across module. FIG. 4 illustrates the additional necessary dimension, the "scale across" dimension, which is taken into consideration for scheduling on the grid 100. As shown, the first computing cluster 202 now has all available resources (nodes) being used, four nodes by Job A 302 and twelve nodes by Job C 402. The second computing cluster 204 now has only four free nodes available because Job B 304 required 4 nodes to run so it took four of the previously available eight nodes of the second computing cluster 204.

The scale across-job migration procedure can be generalized as follows. Assuming that there are M clusters each with N nodes that are interconnected on a grid. At any given point, each of the M clusters may have between N and zero nodes free. A probable compression computation may be performed, which indicates the best compression of the existing running job mix. In the example of FIGS. 3 and 4, the probable compression might indicate that Job A 302 and Job B 304 might be moved to the second computing cluster 204, as needed. The general nature of this computation is to pack each of the computing clusters as tightly as possible, leaving as many large "free node" blocks available as possible for running new jobs.

In the embodiment described above, the probable compression is not acted upon unless an external event occurs, such as the submission of a new job to a job queue. If a new job is introduced to the job queue and cannot be run right away, the probable compression is used by the scale across module 120 to determine if enough resources may be collected at a single cluster to allow the job to run. If so, then from all the steps determined to be necessary to obtain the best compression of the existing running job mix, the specific subset of steps necessary to free the resources necessary to start the new job are determined. This subset of the compression steps are then taken to provide the free resources (as were performed for Job B in the above example to migrate that job to another computing cluster), and the new job is allowed to start. Only the necessary subset steps are run in this embodiment, not all of the steps to perform the entire probable compression. After the new job is started, the probable compression can be recomputed by the scale across module in order to take the running job mix that is now running into account.

Accordingly, the present invention more efficiently and effectively utilizes available resources of a grid computing environment. One or more running jobs can be preempted and migrated to another computing cluster to provide the required free resources for a newly submitted job. The migrated job or jobs is restarted on the other computing cluster from the point at which it was stopped. This on-demand job migration allows dynamic job scheduling and rescheduling to be provided for the grid computing environment.

Grid Computing Architecture

Figure 5:
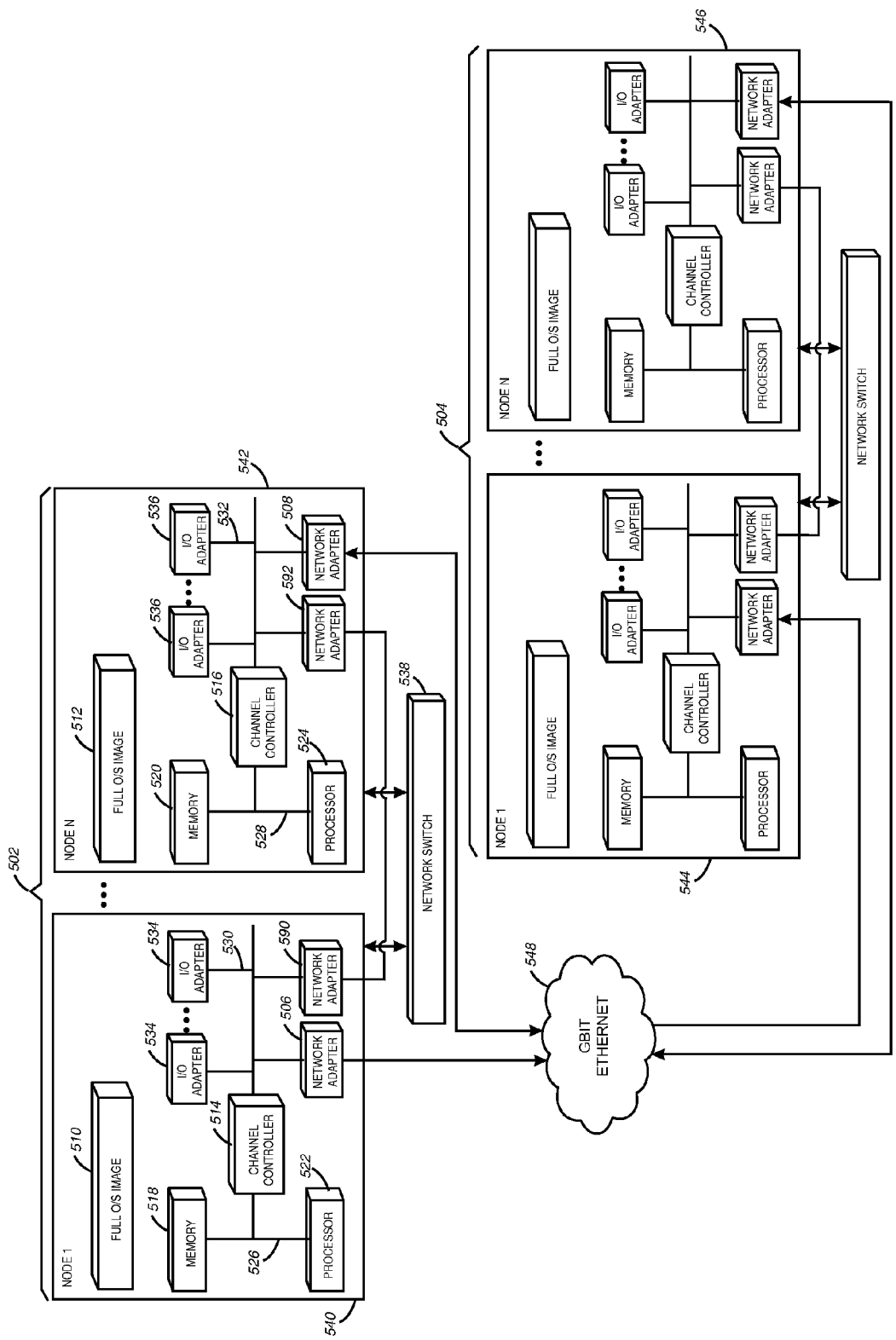
FIG. 5 is a block diagram illustrating an architecture for a grid computing environment according to an exemplary embodiment of the present invention.

FIG. 5 shows an architecture for a grid computing environment according to an exemplary embodiment of the present invention. In this embodiment, the grid computing environment 500 includes a plurality of computing clusters 502 and 504 that include a plurality of nodes 540, 542, 544 and 546. The computing clusters 502 and 504 are coupled to one another via a plurality of network adapters 506 and 508. For example, the network adapters 506 and 508 can be an GBit Ethernet adapter coupling each cluster 502 and 504 to one another through a network 548. Additionally, each node 540, 542, 544, and 546 can also comprise a HPS network adapter 590, 592 that communicatively couples each node in a cluster.

Each computing cluster 502 and 504 is an independent computer with its own operating system image 510 and 512, channel controller 514 and 516, memory 518 and 520, one or more processors 522 and 524, and a system memory bus 526 and 528. A system input/output bus 530 and 532 couples I/O adapters 534 and 536 and network adapter 506 and 508.

Information Processing System

Figure 6:
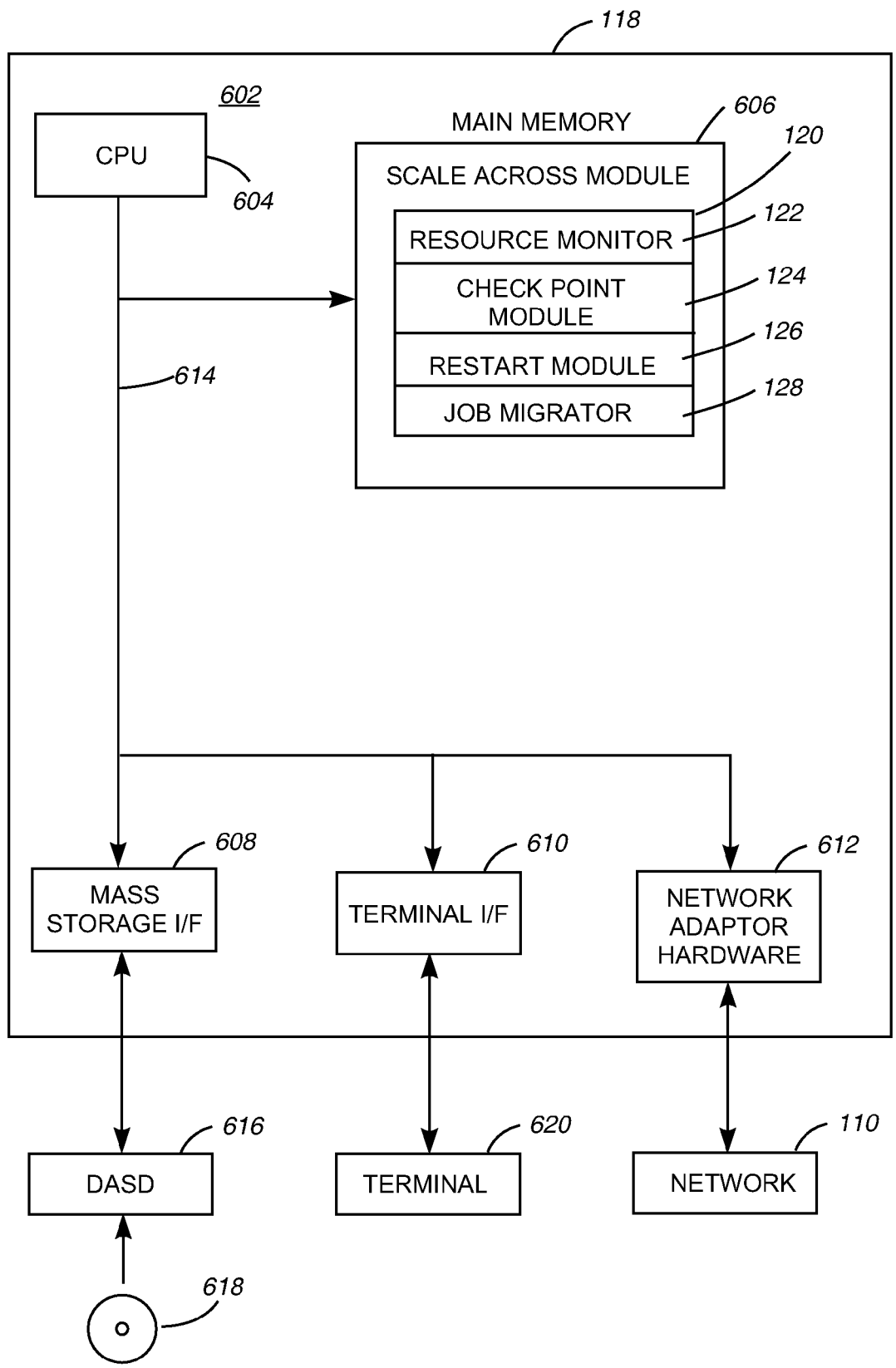
FIG. 6 is a detailed view of the information processing system according to an exemplary embodiment of the present invention.

FIG. 6 is a block diagram illustrating a detailed view of the information processing system 118 according to an exemplary embodiment of the present invention. The information processing system 118, in this embodiment, is a suitably-configured processing system adapted to implement an embodiment of the present invention. Any other suitably-configured processing system is similarly able to be used as the information processing system 118 in further embodiments of the present invention (for example, a personal computer, workstation, or the like).

The exemplary information processing system 118 includes a computer 602. The computer 602 has a processor 604 that is communicatively connected to a main memory 606 (e.g., volatile memory), a non-volatile storage interface 608, a terminal interface 610, and network adapter hardware 612. A system bus 614 interconnects these system components. The non-volatile storage interface 608 is used to connect mass storage devices, such as data storage device 616, to the information processing system 118. One specific type of data storage device is a computer-readable medium such as an optical drive, which may be used to store data to and read data from a CD or DVD 618, or a floppy drive. Another type of data storage device is a hard disk-based data storage device configured to support, for example, NTFS type file system operations.

The main memory 606, in this embodiment, includes the scale across module 120. The scale across module 120 includes the resource monitor 122, checkpoint module 124, job restart module 126, and job migrator 128. The resource monitor 120 monitors the available resources of a computing cluster and determines when to perform probable compression steps. The checkpoint module 124 sets checkpoints for currently running jobs to be migrated. The restart module 126 restarts a job on another computing cluster once the job migrator 128 migrates the job over to that cluster. Although the scale across module 120 is shown as residing on the information processing system 118, one or more of the scale across modules can reside on other information processing systems communicatively coupled to the information processing system 118. And although shown as residing in the main memory 606, some or all of these components can be implemented in hardware or reside elsewhere within the information processing system 118.

In this embodiment, the information processing system 118 utilizes conventional virtual addressing mechanisms to allow programs to behave as if they have access to a large, single storage entity, referred to as "computer system memory", instead of access to multiple, smaller storage entities such as the main memory 606 and data storage device 616. The term "computer system memory" is used herein to generically refer to the entire virtual memory of the information processing system 118.

Although only one CPU 604 is illustrated for computer 602, computer systems with multiple CPUs can be used equally effectively. Embodiments of the present invention can further incorporate interfaces that each includes separate, fully programmed microprocessors that are used to off-load processing from the CPU 604. Terminal interface 610 is used to directly connect one or more terminals 620 to computer 602 to provide a user interface to the computer 602. These terminals 620, which are able to be non-intelligent or fully programmable workstations, are used to allow system administrators and users to communicate with the computer. The terminal 620 is also able to be a user interface and peripheral devices that are connected to computer 602 and controlled by terminal interface hardware included in the terminal interface 610, such as video adapters and interfaces for keyboards, pointing devices, and the like.

An operating system, according to this embodiment, is included in the main memory 606 and is a suitable multitasking operating system such as the Linux, UNIX, Windows XP, or Windows Server operating system. Embodiments of the present invention are able to use any other suitable operating system, or kernel, or other suitable control software. Some embodiments of the present invention utilize architectures, such as an object oriented framework mechanism, that allows instructions of the components of the operating system to be executed on any processor located within the computer. The network adapter hardware 612 is used to provide an interface to a network 110 for communicating with the computing cluster. The network adapter hardware 612 can also allow the information processing system 118 to directly communicate with one or more computing clusters. Embodiments of the present invention are able to be adapted to work with any data communications connections including present day analog and/or digital techniques or via a future networking mechanism.

Although the exemplary embodiments of the present invention are described in the context of a fully functional computer system, embodiments are capable of being distributed as a program product via floppy disk (e.g., floppy disk, CD ROM, or another form of recordable media), or via any type of electronic transmission mechanism.

Process of Performing Potential Job Compression Routine

Figure 7:
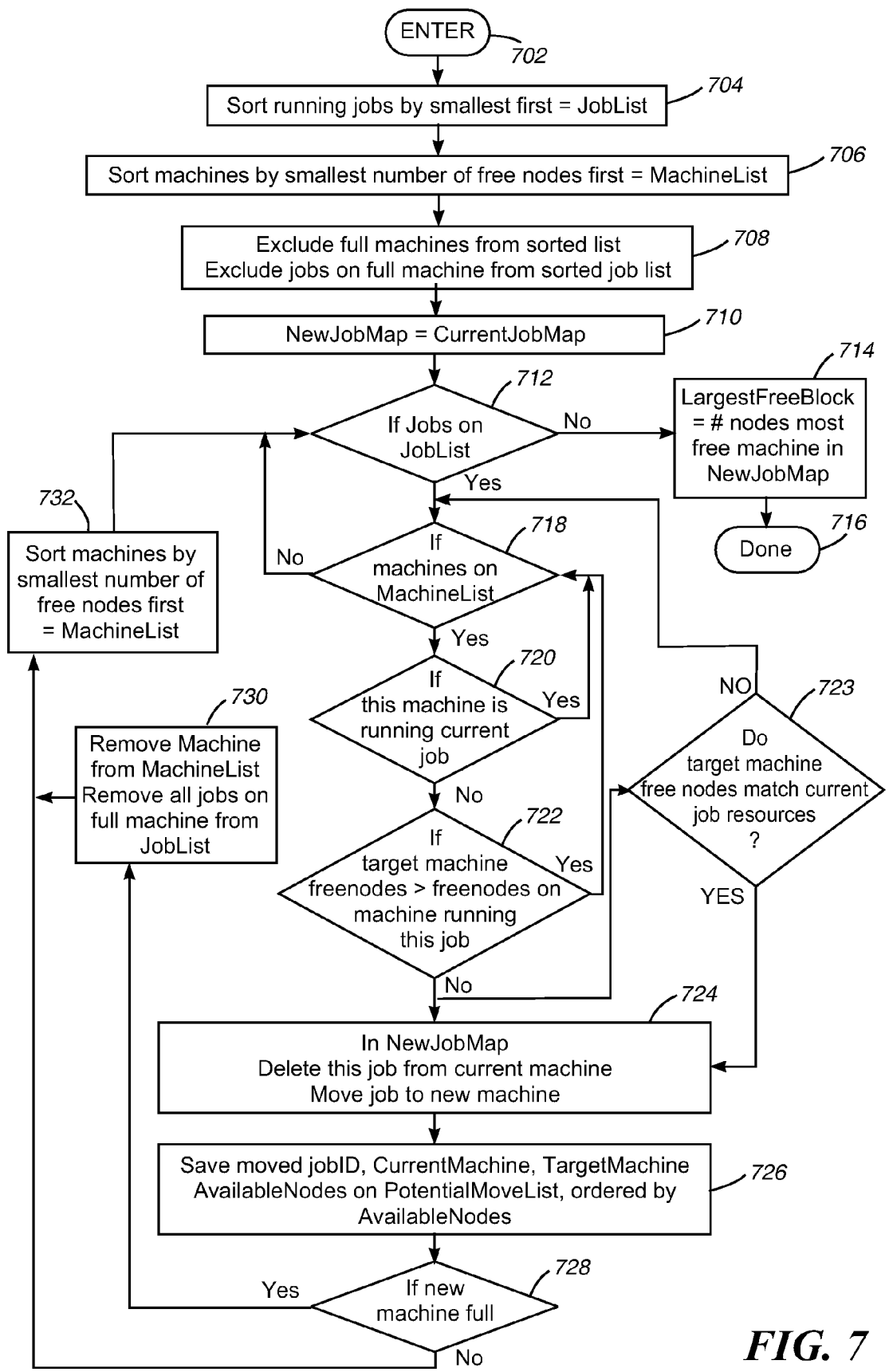
FIG. 7 is an operational flow diagram illustrating a Probable Compression routine for a scale across process according to one embodiment of the present invention.

FIG. 7 illustrates a process of performing a Potential Job Compression Routing ("PJCR") according to one embodiment of the present invention. The PJCR plans compression of jobs onto M available machines. The PJCR establishes data structures to be used to perform a compression as the need arises. The operational flow diagram of FIG. 7 begins at step 702 and flows directly to step 704. The scale across module, at step 704, sorts running jobs by the smallest job first thereby creating a job list. The scale across module, at step 706, sorts machines by smallest number of free nodes first, thereby creating a machine list. Ordering the job list and machine list by smallest first allows for the smallest jobs to be placed in the smallest available slots first.

The scale across module, at step 708, excludes full machines the machine list and excludes jobs on full machines from the job list. The scale across module, at step 710, sets a newjobmap data structure equal to the currentjobmap data structure. The scale across module, at step 712, determines if a job is in the job list. If the result of this determination is negative, the scale across module, at step 714, sets a Largest-FreeBlock data structure equal to the number of nodes in the most free machine in the NewJobMap data structure. The control flow exits at step 716.

If the result of the determination at step 712 is positive, the scale across module, at step 718, determines if there are any machines on the machine list. If the result of this determination is negative the control flow returns to step 712. If the result of this determination is positive, the scale across module, at step 720, determines if this machine is running the current job. If the result of this determination is positive, the control returns to step 718. In other words, the scale across module skips the current machine, which avoids moving the job under current consideration to the same machine on which it is running. If the result of this determination is negative, the scale across module, at step 722, determines if the target machine's free nodes are greater than the free nodes on the machine running the current job.

If the result of this determination is positive, the control returns to step 718. In other words the searching for machines is stopped once the number of free nodes on potential machines grows larger than the free nodes on the current machine. This prevents moving a job from a machine with a lower number of free nodes to one with a larger number of free nodes. Jobs are marked to be moved to a new machine if the target machine has free nodes less than or equal to the current free nodes of this machine.

If the result of the determination at step 722 is negative, the scale across module, at step 723, determines if the target machine free nodes match the current job resources. This is a test to insure the job to be moved fits on the target machine. If the result of this determination is negative, the control flow returns to step 718. If the result of this determination is positive, the scale across module, at step 724, deletes this job from the current machine in the NewJobMap data structure and moves the job to a new machine. The scale across module, at step 726, saves the following data structures moved jobID, CurrentMachine, TagetMachine, AvailableNodes on PotentialMoveList ordered by AvailableNodes. The scale across module, at step 728, determines if the new machine is full. If the result of this determination is positive, the control flows to step 732. If the result of this determination is negative, the scale across module, at step 730, removes the machine from the machine list and all jobs on the full machine are removed from the job list. The scale across module, at step 732, sorts machines by the smallest number of free nodes first and this becomes the new machine list. The control flow returns to step 712.

Process of Starting a Job

Figure 8:
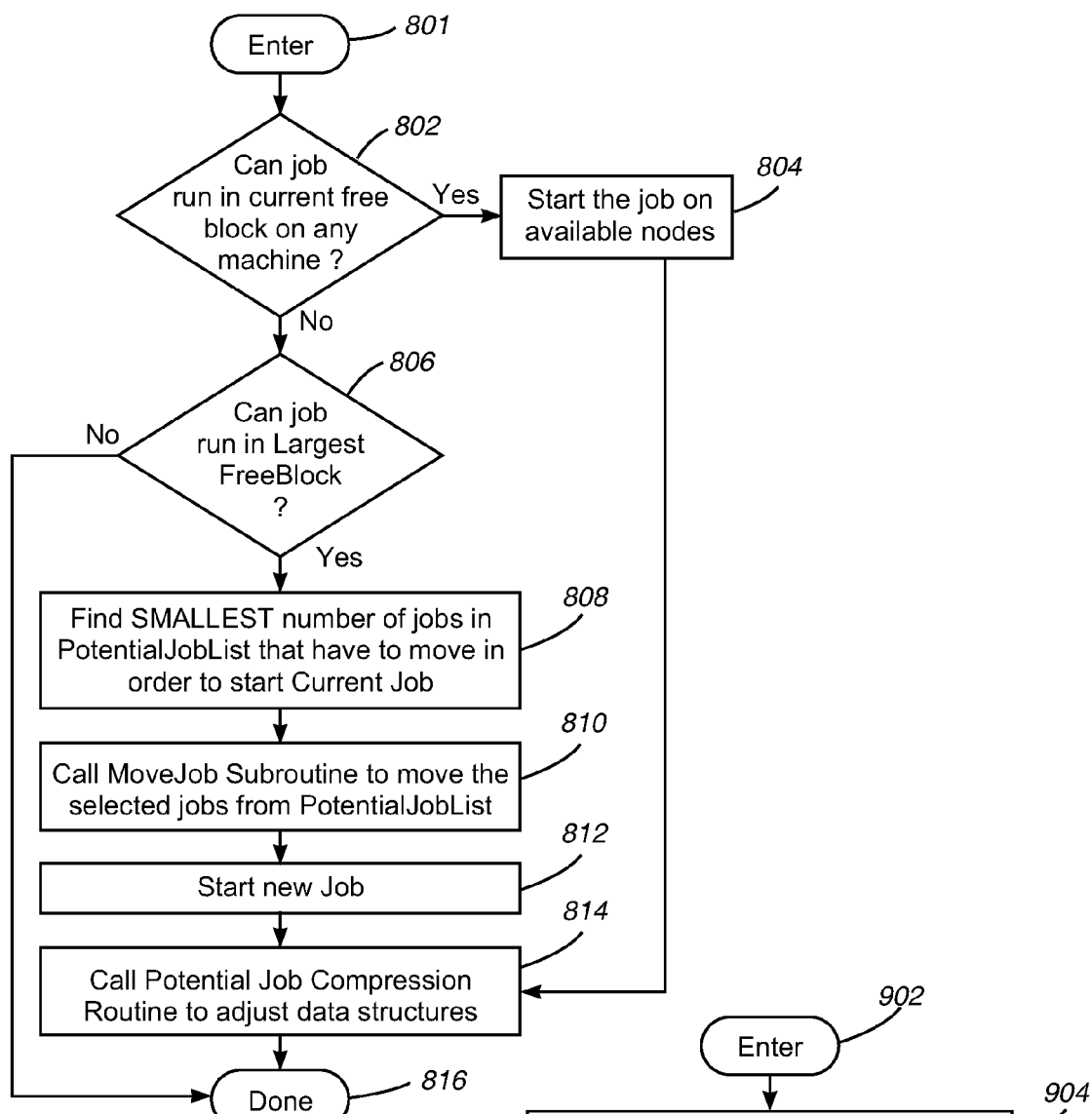
FIG. 8 is an operational flow diagram illustrating in more detail a process for migrating a job to a new computing cluster to more efficiently use available resources in a grid computing environment according to an embodiment of the present invention.

FIG. 8 illustrates a process of starting a job on a system according to an embodiment of the present invention. In particular, FIG. 8 illustrates a process for determining where to start a new job on grid connected clusters. The operational flow diagram of FIG. 8 begins at step 801 and flows directly to step 802. The scale across module, at step 802, determines if a job can run in the current free block on any machine. If the result of this determination is positive, the control flows to step 814. In other words, if the job fits the job starts immediately. However, if the job cannot start on free nodes, but can start if the system where compacted (i.e., result of determination at step 802 is negative) compaction takes place.

The scale across module, at step 806, determines if the job can run in the largest free block. If the result of this determination is negative, the control flow exits at step 816. If the result of this determination is positive, the scale across module, at step 808, identifies the smallest number of jobs in the PotentialJobList data structure that have to be moved in order to start the current job. The scale across module, at step 810, calls the MoveJob subroutine to move the selected jobs from the PotentialJobList. The scale across module, at step, at step 812, starts the new job. The scale across module, at step 814, calls the PJCR to adjust data structures. The control flow exits at step 816.

Process of Moving a Job

Figure 9:
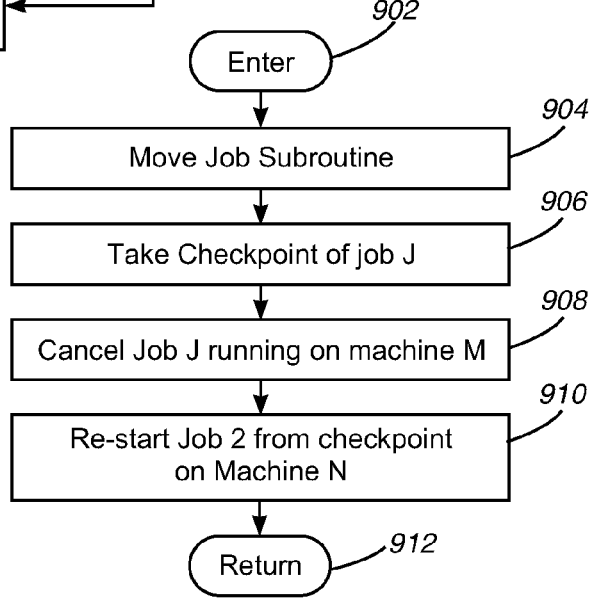
FIG. 9 is an operational flow diagram illustrating a process for moving a job from one cluster to another cluster on a grid according to one embodiment of the present invention.

FIG. 9 illustrates a process of starting a job on a system according to an embodiment of the present invention. The operational flow diagram of FIG. 9 begins at step 902 and flows directly to step 904. The scale across module, at step 904, initializes the move job subroutine. The scale across module, at step 906, takes the checkpoint of Job J. The scale across module, at step 908, cancels Job J running on machine M. The scale across module, at step 910, re-starts Job 2 from the checkpoint on Machine N. The move job subroutine returns at step 912.

The present invention can be produced in hardware or software, or in a combination of hardware and software. In one embodiment, the present invention is implemented in software. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means.

According to the inventive principles as disclosed in connection with the preferred embodiments, the invention and the inventive principles are not limited to any particular kind of computer system but may be used with any general purpose computer arranged to perform the functions described and the method steps described. The operations of such a computer, as described above, may be according to a computer program contained on a medium for use in the operation or control of the computer. The computer medium, which may be used to hold or contain the computer program product, may be a fixture of the computer such as an embedded memory or may be on a transportable medium such as a disk.

The present invention is not limited to any particular computer program or logic or language, or instruction but may be practiced with any such suitable program, logic or language, or instructions. Without limiting the principles of the disclosed invention, any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library, and/or other sequence of instructions designed for execution on a computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing available resources in a grid computing environment that includes a plurality of computing clusters, the method comprising the steps of:
    when a new job is submitted, determining if a first of the computing clusters has sufficient available resources to run the new job;
    if the first computing cluster does not have sufficient available resources to run the new job, determining if a second of the computing clusters has sufficient available resources to run a first job that is currently running on the first computing cluster;
    if the second computing cluster has sufficient available resources to run the first job, migrating the first job to the second computing cluster; and
    after migrating the first job to the second computing cluster, if the first computer cluster still does not have sufficient available resources to run the new job, migrating a second job that is currently running on the first computing cluster to the second computing cluster or to a third of the computer clusters and running the new job on the first computing cluster.

2. The method of claim 1, wherein the migrating step comprises the sub-steps of:
    canceling the first job at the first computing cluster so as to free resources of the first computing cluster; and
    running the first job on the second computing cluster.

3. The method of claim 2, wherein the migrating step further comprises the sub-step of running the new job on the first computing cluster using at least some of the resources of the first computing cluster that were freed by canceling the first job.

4. The method of claim 2,
    wherein the migrating step further comprises the sub-step of setting a checkpoint for the first job before canceling the first job at the first computing cluster, and
    the sub-step of running the first job on the second computing cluster comprises using the checkpoint to restart the first job on the second computing cluster from the point at which it was canceled.

5. The method of claim 1, further comprising the step of monitoring available resources of each of the computing clusters of the grid computing environment.

6. The method of claim 1, wherein the first job is chosen for migration based on job priorities.

7. The method of claim 1, further comprising:
    determining, in response to at least one of a job completing, a job being cancelled, and a detected resource change, a set of potential job migrations;
    determining that the second of the computing clusters does not have sufficient available resources to run the first job;

selecting, in response to determining that the second of the computing clusters does not have sufficient available resources to run the first job, a subset of job migrations from the set of potential job migrations; and applying the subset of job migrations to the second of the computing clusters to free up enough resources on the second of the computing clusters to run the first job.

8. A non-transitory computer-readable medium encoded with a program for managing available resources in a grid computing environment that includes a plurality of computing clusters, said program containing instructions for performing the step of:

when a new job is submitted, determining if a first of the computing clusters has sufficient available resources to run the new job;

if the first computing cluster does not have sufficient available resources to run the new job, determining if a second of the computing clusters has sufficient available resources to run a first job that is currently running on the first computing cluster;

if the second computing cluster has sufficient available resources to run the first job, migrating the first job to the second computing cluster;

determining, in response to at least one of a job completing, a job being cancelled, and a detected resource change, a set of potential job migrations;

determining that the second of the computing clusters does not have sufficient available resources to run the first job;

selecting, in response to determining that the second of the computing clusters does not have sufficient available resources to run the first job, a subset of job migrations from the set of potential job migrations; and applying the subset of job migrations to the second of the computing clusters to free up enough resources on the second of the computing clusters to run the first job.

9. The non-transitory computer-readable medium of claim 8, wherein the migrating step comprises the sub-steps of:

canceling the first job at the first computing cluster so as to free resources of the first computing cluster; and running the first job on the second computing cluster.

10. The non-transitory computer-readable medium of claim 9, wherein the migrating step further comprises the sub-step of running the new job on the first computing cluster using at least some of the resources of the first computing cluster that were freed by canceling the first job.

11. The non-transitory computer-readable medium of claim 9, wherein the migrating step further comprises the sub-step of setting a checkpoint for the first job before canceling the first job at the first computing cluster, and the sub-step of running the first job on the second computing cluster comprises using the checkpoint to restart the first job on the second computing cluster from the point at which it was canceled.

12. The non-transitory computer-readable medium of claim 8, wherein said program further contains instructions for performing the step of monitoring available resources of each of the computing clusters of the grid computing environment.

13. The non-transitory computer-readable medium of claim 8, wherein said program further contains instructions for performing the step of:

after migrating the first job to the second computing cluster, if the first computing cluster still does not have sufficient available resources to run the new job, migrating a second job that is currently running on the first computing cluster to the second computing cluster or to a third of the computing clusters.

14. A grid computing environment, the grid computing environment comprising:

a plurality of computing clusters;

at least one processor communicatively coupled to at least one of the computing clusters, the at least one processor comprising a scale across module for, when a new job is submitted, determining if a first of the computing clusters has sufficient available resources to run the new job, wherein if the scale across module determines that the first computing cluster does not have sufficient available resources to run the new job, the scale across module determines if a second of the computing clusters has sufficient available resources to run a first job that is currently running on the first computing cluster, and if so migrates the first job to the second computing cluster, and after migrating the first job to the second computing cluster, if the first computing cluster still does not have sufficient available resources to run the new job, the scale across module migrates a second job that is currently running on the first computing cluster to the second computing cluster or to a third of the computing clusters.

15. The grid computing environment of claim 14, wherein the scale across module comprises a job migrator for canceling the first job at the first computing cluster so as to free resources of the first computing cluster, and moving the first job to the second computing cluster.

16. The grid computing environment of claim 15, wherein after the scale across module moves the first job to the second computing cluster, the scale across module runs the new job on the first computing cluster using at least some of the resources of the first computing cluster that were freed by canceling the first job.

17. The grid computing environment of claim 15, wherein the scale across module further comprises:

a checkpoint module for setting a checkpoint for the first job before canceling the first job at the first computing cluster; and a job restart module for using the checkpoint to restart the first job on the second computing cluster from the point at which it was canceled.

* * * * *